May 1, 1934. A. H. CARLSON 1,957,319
COOKY CUTTER
Filed Jan. 27, 1934 2 Sheets-Sheet 1
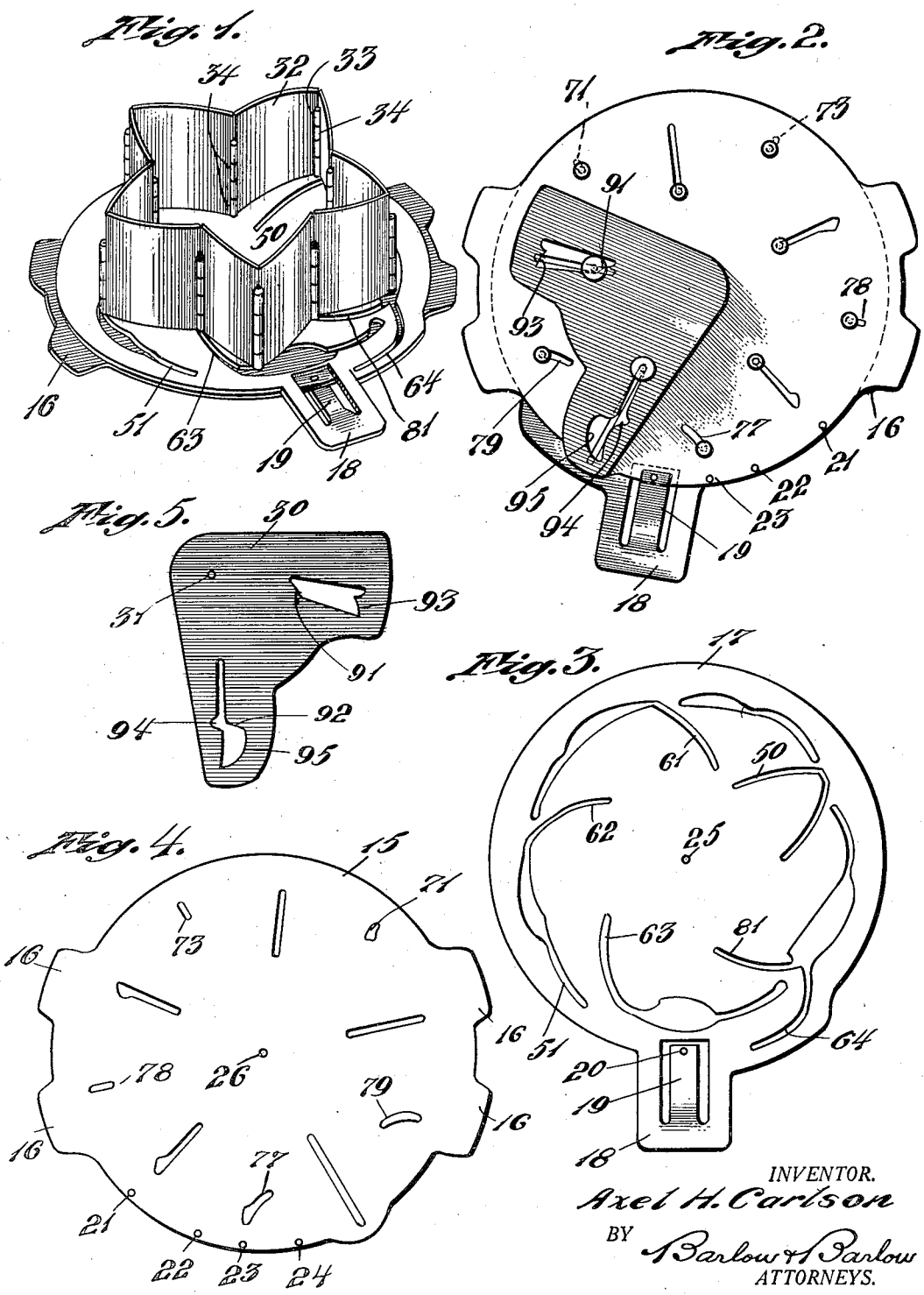

May 1, 1934.  A. H. CARLSON  1,957,319
COOKY CUTTER
Filed Jan. 27, 1934   2 Sheets-Sheet 2
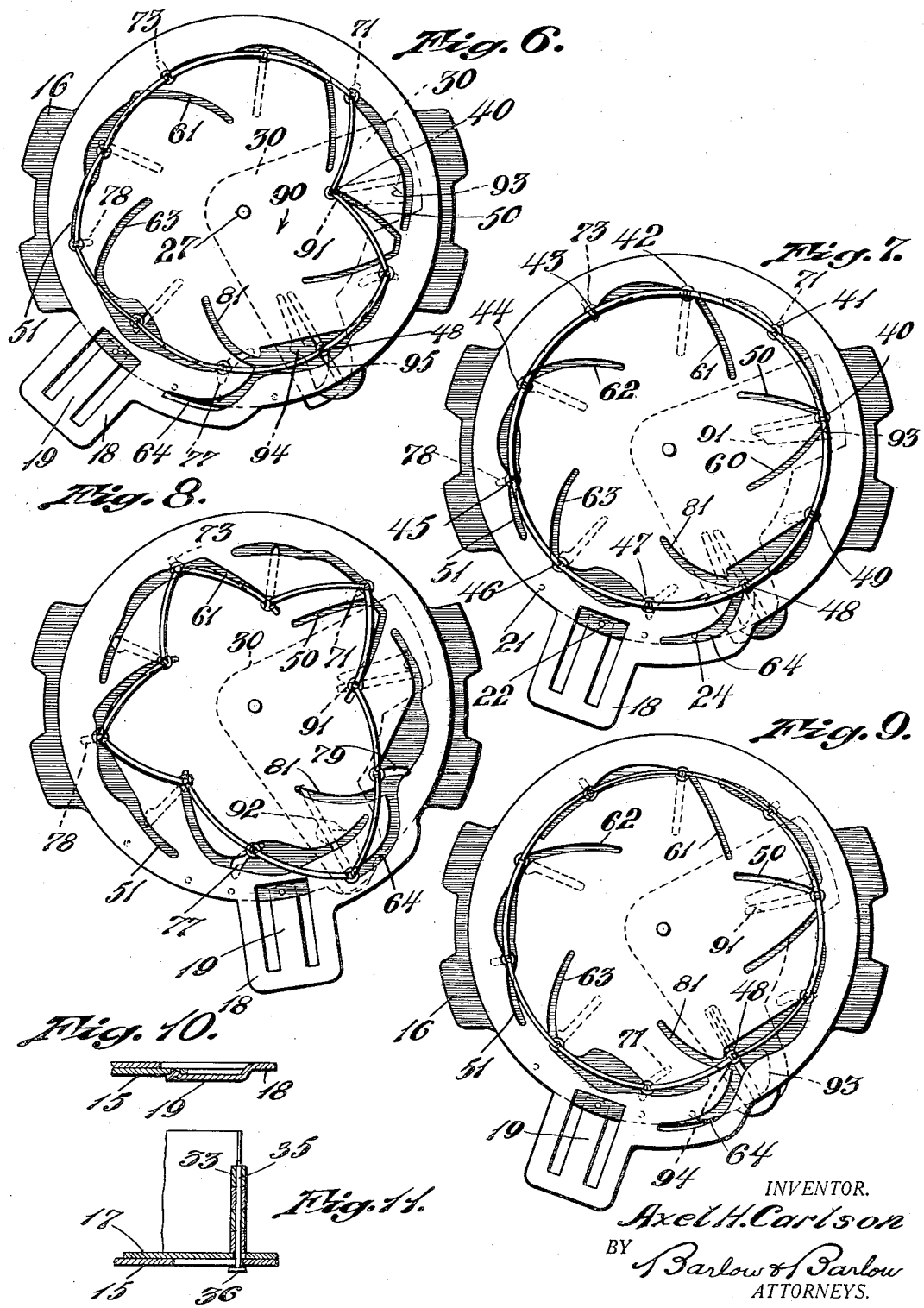
INVENTOR.
Axel H. Carlson
BY Barlow & Barlow
ATTORNEYS.

Patented May 1, 1934

1,957,319

UNITED STATES PATENT OFFICE 1,957,319

COOKY CUTTER

Axel Herbert Carlson, Attleboro, Mass.

Application January 27, 1934, Serial No. 708,680

14 Claims. (Cl. 107—51)

This invention relates to a cooky cutter; and has for one of its objects the provision of a cooky cutter which may be arranged in a plurality of different shapes.

Another object of the invention is the provision of a cooky cutter which may be mechanically adjusted to its different shapes by means of a handle which may be placed in a plurality of different adjusted positions.

Another object of the invention is the provision of an adjustable cooky cutter which may be formed of parts which may be stamped or pressed out in multiple and easily and quickly assembled so that a device economical to manufacture may be produced.

Another object of the invention is the provision of an assembly of parts which require no soldering and little or no riveting to hold the parts in position but which are rather retained by frictional engagement of the parts.

A further object of the invention is the provision of a plurality of plates having a single rivet pivoting them together which may be adjusted to cause sections movable therein to assume various shapes for the cutting of cookies.

With these and other objects in view, the invention consists of certain novel features of construction, as will be more fully described, and particularly pointed out in the appended claims.

In the accompanying drawings:

Fig. 1 is a perspective view of a cooky cutter in one adjusted position showing the same in the position of a five pointed star.

Fig. 2 is a bottom plan view of the device shown in Fig. 1.

Fig. 3 is a plan view of the cam plate.

Fig. 4 is a plan view of the body plate.

Fig. 5 is a plan view of the switch plate for guiding the hinge pins which pivotally connect the section plates along certain desired paths.

Figs. 6, 7, 8 and 9 are plan views illustrating the parts in different adjusted positions and illustrating differently shaped formations which the plates may assume.

Fig. 10 is a sectional view through the handle illustrating the means for holding it in certain desired positions.

Fig. 11 is a sectional view through the hinge eye and pintle for securing the sections together.

It is frequently desired to provide a cooky cutter which in a single unit may be adjusted to several different shapes all by a simple manipulation of a handle sliding it back and forth along the edge of the unit; and in order that this may be accomplished in a simple and practical construction which may be sold at an attractive price, I have provided a form which may be stamped or pressed out of sheet stock and quickly and easily assembled and yet one which by manipulation of the handle will cause it to assume four or five different shapes, any one or more of which may be desired for cutting cookies into fancy shapes; and the following is a detailed description of the present embodiment of this invention illustrating the different means by which these advantageous results may be accomplished:—

With reference to the drawings, 15 designates the body plate which is shaped as illustrated in Fig. 4, and provided with projecting portions 16 on either side for assistance in gripping the plate and with slots generally radially disposed for the movement of pins therein. 17 designates a cam plate which is provided with a handle 18 and a spring tongue 19 which has a detent 20 to frictionally engage and snap into any one of a plurality of depressions or holes or recesses 21, 22, 23 and 24 in the body plate. This cam plate is pivoted at its center openings 25 to the body plate through a center opening 26 and held in this pivotal relation by pin 27 passing therethrough. The cam plate is cut out to form different cam surfaces, as will presently be more fully described and which are best illustrated in Fig. 3.

There is also provided a switch plate 30 also pivotally mounted through an opening 31 on the pin 27. This switch plate is provided with slots of a shape to provide cam surfaces as will be best seen in Fig. 5, and which will be more fully hereinafter explained. Upon these plates, I mount a plurality of section plates 32 which I have illustrated here as ten in number, each slightly arcuate in shape and each rolled to provide spaced eyes 33 at one end and 34 at the other end which are staggered so that they may be placed in aligned arrangement for the reception of the pivot pins 35 which may be passed therethrough. These pivot pins are also passed through the openings in the body and cam plates 15 and 17 and two of these pins also pass through the openings in the switch plate 30. These pins are each headed as at 36 to limit their movements in one direction while the upper rolled eye 13 is rolled sufficiently smaller than the diameter of the pin so that this eye must be spread and will frictionally grip the pin to hold it in place. When the sections 32 are all joined together in this way, there is formed an enclosure which is flexible and may be manipulated into many different shapes. One of the shapes which the sections may assume is that of substantially a circle, in which position the detent 20 of the handle 18 engages opening 22, as illustrated in Fig. 7, and with this position as a starting point I will describe several different positions which the section plates may assume. The pivot pins are designated consecutively 40, 41, 42, 43, 44, 45, 46, 47, 48, and 49. If the handle 18 were moved from the position where its detent engages the opening 22 to the position where its detent engages the opening 21 such as shown in Fig. 6, this relative movement of the two plates 15 and 17 will cause the pin 40 to move inwardly in the slot 50 so as to draw the plates between pins 40 and 41; 40 and 49 inwardly, while the pin 45 will be drawn out along the slot 51 thereby drawing the plates between 45 and 44 and 45 and 46 outwardly slightly. The remaining pins are scarcely moved by reason of the surfaces of the slots in which they are located being substantially equally distant from the pivot pin, and thus a generally heart-shaped figure is formed.

Assuming the handle 18 to be moved from its position 22 in the opposite direction to the stop 24, the pivot 40 will be moved inwardly along the slot 60, the pivot 42 will be moved inwardly along the slot 61, the pivot 44 will be moved inwardly along the slot 62, pivot 46 will be moved inwardly along the slot 63, while the pivot 48 will be moved outwardly along the slot 64. The intermediate pivots 41, 43, 45, 47 and 49 will be moved inwardly only slightly and retained in a position substantially equally distant from the pivot 27 by reason of the limited movement permitted them in the slots 71, 73, 77 and 79 through which they extend, and thus I provide a shape somewhat of a distorted clover altho I will call it a clover for the purpose of description.

The cam plate is also provided with a slot 81 into which slot the pin 48 may extend instead of moving into the slot 64, while the other pins will be in the positions which they assume to form the clover. Thus instead of drawing the pin 48 outwardly I will force this pin inwardly which will provide a five pointed star, such as shown in Fig. 1. The movements of the pin 48 into slot 64 or 81 to form either the star or clover may be guided by hand at the time the handle 18 is moved from the circle to the stop 24, however I prefer to mechanically guide this pin into either one of these slots by the switch plate which I designate 30.

This switch plate is thrown to its two extreme positions upon movement of the handle 18 to its two extreme positions. One of these extreme positions guides the pin 48 into the slot 64 to form the clover while the other extreme position guides the pin 48 into slot 81 to form the star. Thus if I move the handle to the extreme position which will move the plate 30 in the position to guide the pins to form the star, then move the handle out to the circle or intermediate position and then throw it back into the position of the stop 24, I will form a star. If I move the handle from any position all the way across to the stop 21 I will move the switch plate to its other extreme position and if I then move the handle back to the stop 24 I will form the clover.

In Fig. 6, the switch plate 30 has been caused to move in a direction of the arrow 90 by reason of the pin 40 engaging and sliding along the cam surface 91 as the pin moves inwardly, which is caused by movement of handle 18 to position 21. In this position the switch plate 30 so positions the pin 48, as the handle 18 is moved from the stop 21 to the stop 24, by reason of the shape of the edge of the notch 92, that the pin 48 will move along the slot 64, the offset or cam surface 92 serving to steer this pin 48 in this manner. When, however, the handle is moved to the stop 24, the switch plate is moved in a direction opposite to arrow 90 by pin 48 sliding along surface 95, if the handle is then returned part way or to the circle position, the cam surface 93 by reason of movement of pin 40 therealong serves to move the switch plate so that the pin 48 will be located and guided into the notch 94 and thus in position so that it will enter the slot 81 instead of the slot 64. Thus if the handle be returned to the stop 24 after the intermediate position is reached, which in practice is the circle, the plates will assume the position of the star such as shown in Fig. 1.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. In a cooky cutter, a flexible enclosure, comprising a plurality of sections, and mechanical means for moving said enclosure to assume a plurality of different shapes.

2. In a cooky cutter, a flexible enclosure, comprising a plurality of sections, and mechanical means including a handle for moving said enclosure to assume a plurality of different shapes.

3. In a cooky cutter, a body plate, a plurality of section plates pivoted at their ends and mounted on said body plate, and means movable with reference to said body plate for moving said section plates simultaneously to different positions.

4. In a cooky cutter, a body plate, a plurality of section plates pivoted at their ends and supported on edge on said plate, and cam means movable with reference to said body plate for moving said section plates simultaneously from one position to another position.

5. In a cooky cutter, a body plate, a plurality of section plates pivoted at their ends and supported on edge on said plate, a cam plate movable with reference to said body plate and provided with cams for moving said section plates, a handle for relatively moving said cam plate for shifting said section plates to form at least two different shapes by a continuous movement in one direction.

6. In a cooky cutter, a body plate, a plurality of section plates pivoted at their ends and supported on edge on said plate, a cam plate movable with reference to said body plate and provided with cams for moving said section plates, a handle for relatively moving said cam plate for shifting said section plates to form at least three different shapes by a continuous movement in one direction.

7. In a cooky cutter, a body plate, a plurality of section plates pivoted at their ends and supported on edge on said plate and cam means movable with reference to said body plate for moving said section plates simultaneously from one position to at least two other positions by a continued movement in one direction.

8. In a cooky cutter, a body plate, a plurality of section plates supported on edge on said body plate and swingably connected together at their ends, means for moving said section plates simultaneously from a generally circular formation selectively to any one of several positions.

9. In a cooky cutter, a body plate, a plurality of section plates supported on edge on said body plate and swingably connected together at their ends, means for moving said section plates simultaneously from a generally circular formation to a star formation.

10. In a cooky cutter, a body plate, a plurality of section plates supported on edge on said body plate and swingably connected together at their ends, means for moving said section plates simultaneously from a generally circular formation to a generally heart formation.

11. In a cooky cutter, a body plate, a plurality of section plates supported on edge on said body plate and swingably connected together at their ends, means for moving said section plates simultaneously from a generally circular formation to a symmetrical formation with three small points and one large point.

12. In a cooky cutter, a body plate, a plurality of section plates, a pin for pivoting said plates together, and friction means for removably retaining said pin in working position.

13. In a cooky cutter, a flexible enclosure, comprising a plurality of sections, mechanical means for moving said enclosure to assume a plurality of different shapes, and means for maintaining said enclosure in each of said plurality of different positions.

14. In a cooky cutter, a flexible enclosure, comprising a plurality of sections, mechanical means including a handle for moving said enclosure to assume a plurality of different shapes, a detent on said handle, and recesses in the portions along which it moves to maintain said handle in adjusted position.

AXEL HERBERT CARLSON.